US011366802B1

(12) United States Patent
Kharatishvili et al.

(10) Patent No.: US 11,366,802 B1
(45) Date of Patent: Jun. 21, 2022

(54) BATCH UNDO PROCESSING FOR TRANSACTION ROLLBACKS IN A MULTI-WRITER DATABASE

(71) Applicant: Amazon Technologies, Inc., Seattle, WA (US)

(72) Inventors: Tengiz Kharatishvili, Sammamish, WA (US); Alexandre Olegovich Vebitski, Woodinville, WA (US); Justin Levandoski, Seattle, WA (US); Niket Goel, Seattle, WA (US); Xiang Peng, Mountain View, CA (US); Kamal Kant Gupta, Belmont, CA (US); Xiaofeng Bao, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 446 days.

(21) Appl. No.: 16/586,355

(22) Filed: Sep. 27, 2019

(51) Int. Cl.
 *G06F 16/23* (2019.01)
 *G06F 16/18* (2019.01)

(52) U.S. Cl.
 CPC ...... *G06F 16/2365* (2019.01); *G06F 16/1865* (2019.01); *G06F 16/2358* (2019.01)

(58) Field of Classification Search
 CPC ............. G06F 16/2365; G06F 16/2358; G06F 16/1865
 USPC ........................................................ 707/684
 See application file for complete search history.

(56) References Cited

U.S. PATENT DOCUMENTS

| 7,266,702 | B2 | 9/2007 | Hotti |
| 7,620,659 | B2 | 11/2009 | Novik et al. |
| 8,909,610 | B2 | 12/2014 | Reid et al. |
| 9,613,078 | B2 | 4/2017 | Vermeulen et al. |
| 9,665,609 | B2 | 5/2017 | Andrei et al. |
| 10,127,260 | B2 | 11/2018 | Goel et al. |
| 2004/0117345 | A1* | 6/2004 | Bamford ............. G06F 16/2386 |
| 2004/0177100 | A1 | 9/2004 | Bjorner et al. |
| 2005/0187891 | A1* | 8/2005 | Johnson ................ G06F 11/202 |
| 2006/0004885 | A1 | 1/2006 | Lubashev et al. |

(Continued)

FOREIGN PATENT DOCUMENTS

WO 2020119050 6/2020

OTHER PUBLICATIONS

U.S. Appl. No. 16/586,497, filed Sep. 27, 2019, Justin Levandoski.

(Continued)

*Primary Examiner* — James Trujillo
*Assistant Examiner* — Fariborz Khoshnoodi
(74) *Attorney, Agent, or Firm* — Robert C. Kowert; Kowert, Hood, Munyon, Rankin & Goetzel, P.C.

(57) ABSTRACT

Batch processing of undo log records may be performed for rolling back a database transaction. When a rollback operation for a database transaction is performed, undo log records from an undo log to rollback the database transaction are divided into different groups of undo log records. Different requests for the different undo log records are sent to a storage system to be performed. If a conflict is detected for an undo log record in a group, an indication of the conflicting undo log record may be provided to indicate the conflict. The group of undo log records may be resent with a request to reapply the undo log records in the group. When all groups have been identified as successfully completed, then the rollback operation may be considered completed.

20 Claims, 10 Drawing Sheets

(56) References Cited

U.S. PATENT DOCUMENTS

| | | | | |
|---|---|---|---|---|
| 2006/0212492 | A1* | 9/2006 | Jacobs | G06F 16/2477 |
| 2007/0005664 | A1* | 1/2007 | Kodavalla | G06F 11/1471 |
| 2007/0083530 | A1* | 4/2007 | Lakshminath | G06F 9/466 |
| 2011/0029490 | A1 | 2/2011 | Agarwal et al. | |
| 2016/0147814 | A1 | 5/2016 | Goel et al. | |
| 2017/0357577 | A1 | 12/2017 | Lee et al. | |
| 2018/0150360 | A1* | 5/2018 | Kwon | G06F 16/2365 |
| 2019/0325055 | A1* | 10/2019 | Lee | G06F 3/0644 |

OTHER PUBLICATIONS

U.S. Appl. No. 16/586,563, filed Sep. 27, 2019, Tengiz Kharatishvili.
U.S. Appl. No. 16/586,235, filed Sep. 27, 2019, Tengiz Kharatishvili.
"Backing Up and Archiving the Database", Database Administrator's Reference, Oracle Database Documentation Library 11g Release 2 (11.2), 2013, pp. 1-9.
Amazon, "What is Amazon Relational Database Service (Amazon RDS)?", Retrieved from https://dock.aws.amazon.com/AmazonRDS/latest/UserGuide, 2018, pp. 1-6.
David Lomet, et al., "Multi-Version Concurrency via Timestamp Range Conflict Management", 2012 IEEE 28th International Conference on Data Engineering, 2012, pp. 714-725.

* cited by examiner

BATCH UNDO PROCESSING FOR TRANSACTION ROLLBACKS IN A MULTI-WRITER DATABASE

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling to meet demand, many computing-related systems or services are implemented as distributed applications, each application being executed on a number of computer hardware servers. For example, a number of different software processes executing on different computer systems may operate cooperatively to implement a computing service. When more service capacity is needed, additional hardware or software resources may be deployed to increase the availability of the computing service.

While adding additional computing resources can facilitate application scaling, doing so significantly increases the complexity of the distributed system when performing various operations. For example, a database hosted at a distributed system or application may allow multiple different processes implemented at separate computer systems to perform writes to the database. Because multiple writers can write to the database, distributed concurrency techniques are needed to ensure that writes are consistently performed across the distributed system, without violating the various consistency requirements of the database system. Similarly, for sets of writes in transactions, distributed concurrency techniques that can handle the success and failure of transactions without violating the various consistency requirements of the database system may be highly desirable.

Figure 1:
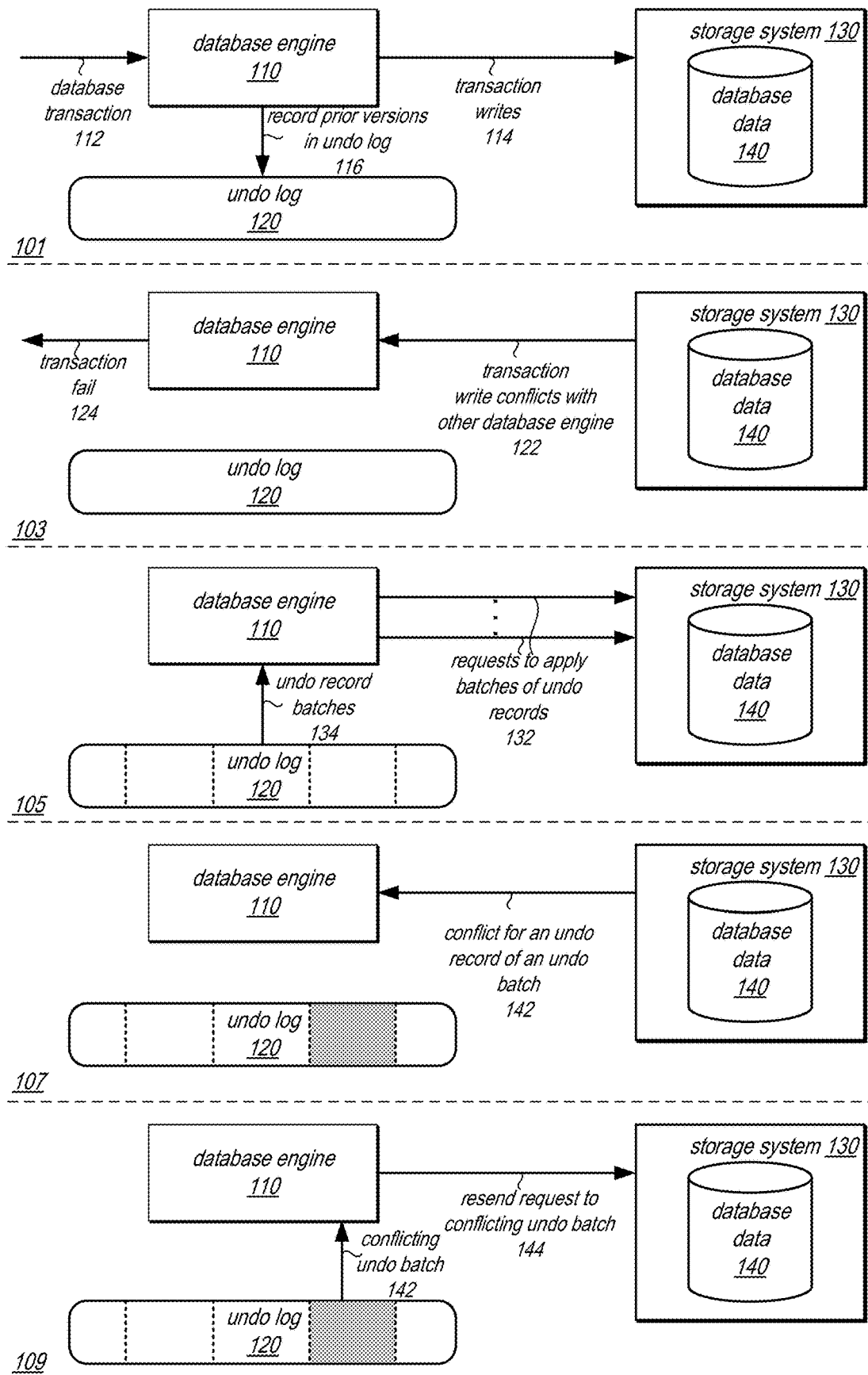
FIG. 1 is a block diagram illustrating batch undo processing for transaction rollbacks in a multi-writer database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for batch undo processing in transaction rollbacks are described herein. Database systems may support transactions to allow a group of operations to a database to succeed or fail together at a database, in various embodiments. For example, some financial record updates may be grouped as a transaction, such as a debit to a first account (that is a source for a funds transfer) and a credit to a second account (that is a destination for the funds transfer). A transaction may be used to group the debit and credit operations together so that neither one is performed and unless the other one is performed.

Transactions may be aborted by a client application in some scenarios. For instance, if a customer cancels the funds transfer, such a cancellation may cause a client application that executes the funds transfer to send a request to abort the database transaction to the database. In some scenarios, the transaction may fail because an operation cannot complete successfully. For example, another write request to debit the first account may be submitted by another client application which may modify the balance of the first account to leave insufficient funds to complete the transaction.

Whether aborted or failed, when a transaction cannot complete, changes to the database may be undone by a rollback operation. For instance, in the above example, a credit or debit operation that did complete would need to be undone in order to return the database to a state where neither operation completed successfully (e.g., because the transaction operations failed together). A rollback operation may be implemented in various embodiments in order to handle scenarios, such as those described above where transactions do not complete and the effects of the transaction need to be removed from the database.

In various embodiments, rollback operations may be performed by utilizing an undo log. An undo log may store data that describes previous versions of database data with the application of transaction operations. Continuing with the above example, an undo log may describe a balance of the first account before the debit operation and a balance of the second account before the credit operation. Undo log records may be used or applied to overwrite changes to database data with the version of the database data that does not include the transaction.

Long running and/or write intensive transactions can accumulate large undo record logs. However, as noted above, the application of undo log records can be implemented by performing another write to database data to return the database data to a prior state. In a multi-writer database these writes may conflict with other database writers or any other operations that write to database data, and thus may be held up in a conflict resolution process that may involve retrying and possibly resulting in one or multiple unsuccessful attempts to apply undo log records. In various embodiments, batch undo processing may improve the performance of a database engine by reducing the cost of conflicts when performing undo writes to apply an undo log record when performing a rollback operation.

For example, batch undo processing may improve performance of a database engine because the amount of time to complete a rollback operation may be significantly reduced. For example, in some scenarios approximately 99% of rollback operation execution time (e.g., 400 seconds for 256,000 undo log records) consists of waiting for individual undo log records to be applied without conflict. Instead of waiting for individual requests for individual undo records to be written to storage, multiple requests to apply undo records can be processed as a batch so that no one request necessarily waits on another. Another performance improvement may be a reduction in the complexity and thus resource utilization (e.g., storage overhead costs) of performing a rollback operation. This performance improvement may be achieved because undo log records may be applied in idempotent fashion to database data, so that if an undo log record is repeated (e.g., because a write in a batch fails, then that write will not have to be tracked or otherwise remembered as already performed. Instead, the batch of undo records can be repeated without additional costs of determining which records in the undo batch should not be reapplied.

FIG. 1 is a block diagram illustrating batch undo processing for transaction rollbacks in a multi-writer database, according to some embodiments. Scene 101 illustrates a database engine 110 which may provide access to a database, by send access requests to storage system 130 storing database data 140. Database engine 110 may implement many different types of database engines that support access to data stored according to different database schemes. For example relational databases may be one type of database scheme supported by database engine 110. Or database engine 110 could provide access to a database that utilizes a non-relational scheme (e.g., an object, graph, document, NoSQL, or key-value database). As different types of database schemes may allow for and support transactions, the techniques for performing roll back operations for those database transactions utilizing a database engine 110 and storage system 130 as depicted in FIG. 1 may be applicable to the different database schemes and the database systems that implement them. In some embodiments, database engine 110 may be a database engine head node and storage system 130 may be a distributed storage service or log structure storage service as discussed below with regard to FIGS. 2-7.

Database engine 110 may perform a database transaction 112 on behalf of a client application (not illustrated). For instance, database transaction 112 may utilize application programming interfaces (APIs) or query language support, such as Structured Query Language (SQL) to begin or start database transaction 112. Different operations may be submitted as part of database transaction 112, including reads to the database and changes to the database. Database engine 110 may perform various transaction writes 114 that result in changes to database data 140. To store prior versions of the database data 140 prior to the application of transaction writes, prior versions 116 may be recorded in undo log 120 in the event that database transaction fails to complete.

In a multi-writer database, conflict detection techniques may be implemented to coordinate between writes to the database that are directed to the same portion of database data (e.g., a same record, column value, item, object, etc.). Conflict detection may be implemented, in at least some embodiments, at a separate storage system, such as storage system 130. When two writes to the same portion of database data 140 is received, storage system 130 may respond to one of the database engines that submitted the conflicting write with an error or other indication of a conflict and that the write did not succeed. Further examples of such techniques are discussed below with regard to FIGS. 4 and 5. As illustrated in scene 103, storage system 130 indicates that a transaction write conflicts with another database engine 122 that may be writing the same portion of database data 140. The transaction write did not succeed, so a transaction fail indication 124 may be sent. A rollback event may be triggered to perform a rollback operation in response to the rollback event. In other scenarios (not illustrated) a transaction may be aborted in response to a request to abort the transaction from a client, which may trigger performance of a rollback operation.

As illustrated in scene 105, database engine 110 may begin to perform a rollback operation. Instead of performing and waiting for individual requests for individual undo records to succeed before requesting application of a next undo record, database engine 110 may submit request(s) 132 to apply a batch of undo records 134 for database transaction 112 from undo log 120 be applied (e.g., as individual requests sent in asynchronous fashion or as a special batch write/apply request), in some embodiments. As discussed in detail below with regard to FIGS. 5-9, the undo log records may be divided into groups to be handled as a batch. In some embodiments, one batch at a time may be processed (e.g., until all undo's succeed for that batch), or multiple batches may be processed until all are complete).

As illustrated in scene 107, a conflict for undo record of an undo batch may be received 142 from storage system 130. A conflict may occur because of another database engine write (e.g., a client write or undo write) 142 may be received. However, any other write performed to a same portion of the database data 140 may cause a conflict. As illustrated in scene 109, database engine 110 may resend 144 the conflicting undo batch 142 to storage system 130 to be applied to database data 140. In this way conflict detection may continue to be implemented, but such techniques may have a significantly reduced performance impact on a database engine performing many writes to apply undo log records as part of a rollback operation. Such techniques may continue until all undo log records have been applied so that the rollback operation is complete.

Please note, FIG. 1 is provided as a logical illustration and is not intended to be limiting as to the physical arrangement, size, or number of components, or devices to implement such features.

The specification first describes an example of a network-based services platform that may implement a database service and storage service, according to various embodiments. Included in the description of the example network-based services are techniques for batch undo processing for transaction rollbacks in a multi-writer database. The specification then describes a flowchart of various embodiments of methods for batch undo processing for transaction rollbacks in a multi-writer database. Next, the specification describes an example system that may implement the disclosed techniques. Various examples are provided throughout the specification.

Figure 2:
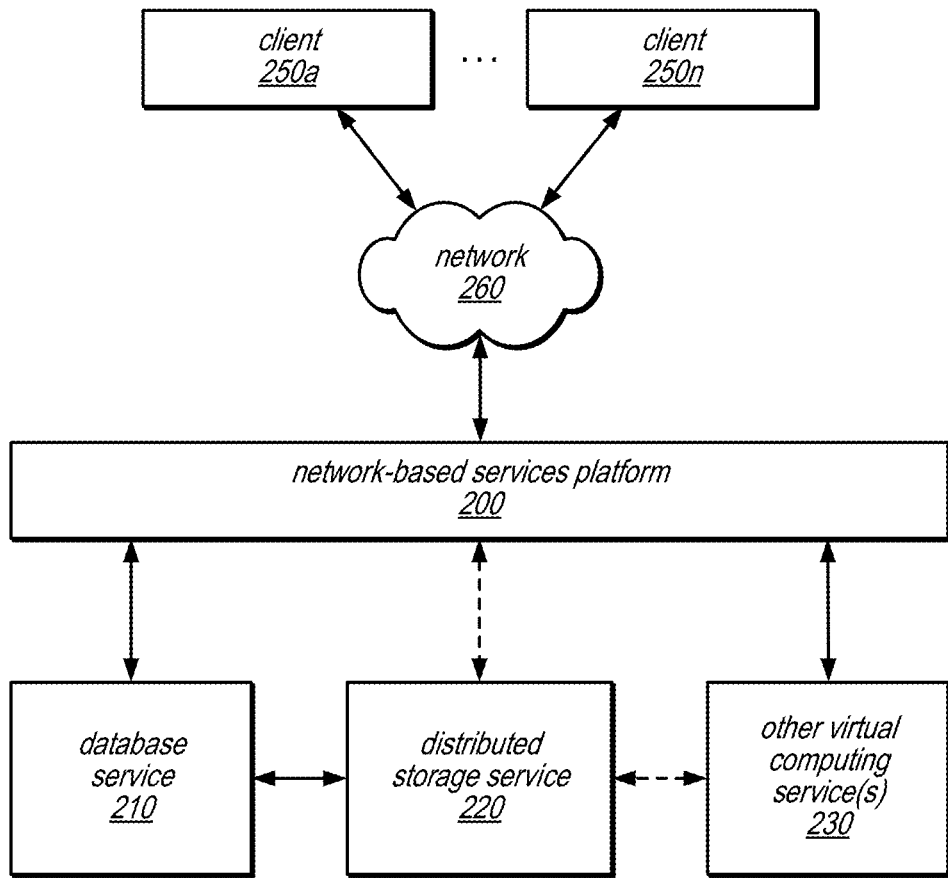
FIG. 2 is a block diagram illustrating a service system architecture that may implement a database service that implements batch undo processing for transaction rollbacks in a multi-writer database, according to some embodiments.

FIG. 2 is a block diagram illustrating a service system architecture that may implement a database service that implements batch undo processing for transaction rollbacks in a multi-writer database, according to some embodiments. In some embodiments, the clients 250 may be the clients that submit a databases transaction in FIG. 1, the database service 210 may implement the database engine in FIG. 1, and the distributed storage service 220 may be the storage system in FIG. 1.

In the illustrated embodiment, a number of clients (shown as clients 250a-250n) interact with a network-based services platform 200 via a network 260. Network-based services platform 200 may interface with one or more instances of a database service 210, a storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to network-based services platform 200 via network 260, including requests for database services (e.g., a request to generate a snapshot, etc.). For example, a given client 250 may include a suitable version of a web browser, or may include a plug-in module or other type of code module that may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application that interacts directly with network-based services platform 200. In some embodiments, client 250 may generate web services requests according to a Representational State Transfer (REST)-style web services architecture, a document- or message-based web services architecture, or another suitable web services architecture.

In some embodiments, a client 250 (e.g., a database service client) may provide access to web services-based storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of any particular storage system service model. In some embodiments, the details of interfacing to Network-based services platform 200 may be coordinated by client 250 and the operating system or file system on behalf of applications executing within the operating system environment.

Clients 250 may convey web services requests (e.g., a request to start/abort/commit a database transaction, a snapshot request, parameters of a snapshot request, read request, restore a snapshot, query, write, etc.) to and receive responses from network-based services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may implement one or more service endpoints to receive and process web services requests, such as requests to access data pages (or records thereof). For example, network-based services platform 200 may include hardware and/or software to implement a particular endpoint, such that an HTTP-based web services request directed to that endpoint is properly received and processed. In one embodiment, network-based services platform 200 may be implemented as a server system to receive web services requests from clients 250 and to forward them to components of a system that implements database service 210, distributed storage service 220 and/or another virtual computing service 230 for processing. In other embodiments, network-based services platform 200 may be implemented as a number of distinct systems (e.g., in a cluster topology) implementing load balancing and other request management features to dynamically manage large-scale web services request processing loads. In various embodiments, network-based services platform 200 may support REST-style or document-based (e.g., SOAP-based) types of web services requests.

In addition to functioning as an addressable endpoint for clients' web services requests, in some embodiments, network-based services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, the platform 200 may also implement user authentication and access control procedures. For example, for a given web services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding web services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent one interface through which clients 250 may access the features of a database system that implements database service 210, it need not represent the sole interface to such features. For example, an alternate API that may be distinct from a web services interface may be used to allow clients internal to the enterprise providing the database system to bypass network-based services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may receive storage services from distributed storage service 220 (e.g., through an API directly between the virtual computing service 230 and storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Figure 3:
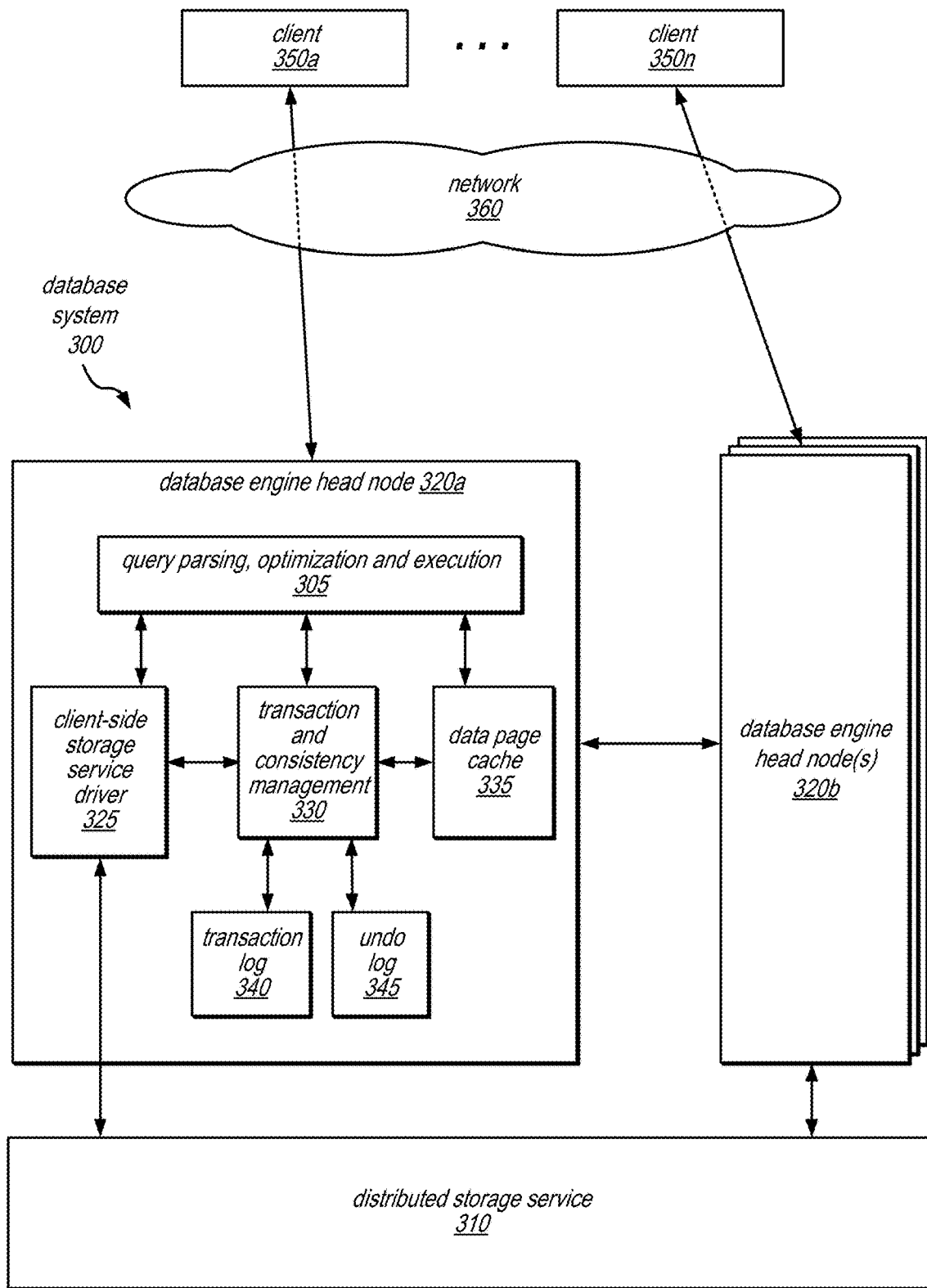
FIG. 3 is a block diagram illustrating various components of the database engine head node in a multi-writer database that implements batch undo processing for transaction rollbacks in a multi-writer database, according to some embodiments.

FIG. 3 is a block diagram illustrating various components of the database engine head node in a multi-writer database that implements batch undo processing for transaction rollbacks in a multi-writer database, according to some embodiments. In some embodiments, the database the database engine head nodes 320a and 320b may be implement different database engines nodes like the database engine in FIG. 1, and the distributed storage service 310 may be the storage system of FIG. 1.

As shown, database system 300 includes one or multiple respective database engine head nodes 320 for each of several databases and a storage service 310 (which may or may not be visible to the clients of the database system, shown as clients 350a-350n). For example, database engine head node 320a may serve as an access point for providing read and write access to a database. As illustrated in this example, one or more of clients 350a-350n may access a database head node 320 via network 360 (e.g., these components may be network-addressable and accessible to the clients 350a-350n). However, storage service 310, which may be employed by the database system to store data pages of one or more databases (and redo log records and/or other metadata associated therewith) on behalf of clients 350a-350n, and to perform other functions of the database system as described herein, may or may not be network-addressable and accessible to the clients 350a-350n, in different embodiments. For example, in some embodiments, distributed storage service 310 may perform various storage, access, change logging, recovery, log record manipulation, and/or space management operations in a manner that is invisible to clients 350a-350n.

As previously noted, each database instance may include multiple database engine head nodes 320 that receives requests (e.g., requests that cause writes such as update or insert requests, etc.) from various client programs (e.g., applications) and/or subscribers (users), then parses them, optimizes them, and develops a plan to carry out the associated database operation(s). In this example, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As shown, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance, such as applying undo log records to generate prior versions of tuples of a database in order to roll back changes not visible for performing a query. As shown, database engine head node 320a may also include a transaction log 340 and an undo log 345, which may be employed by transaction and consistency management component 330 to track the status of various transactions and roll back any results of transactions that do not commit.

Note that each of the other database engine head nodes 320 illustrated in this figure (e.g., 320a and 320b) may include similar components and may perform similar functions for queries received by one or more of clients 350a-350n and directed to the respective database instances of which it is a component.

In some embodiments, the storage systems described herein may organize data in various logical volumes, segments, and pages for storage on one or more storage nodes. For example, in some embodiments, each database may be represented by a logical volume, and each logical volume may be segmented over a collection of storage nodes. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. As described in detail herein, the storage nodes may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on a storage device; rather there may be an allocation map in each storage device describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of memory, generally of fixed size. In some embodiments, each page may be a block of memory (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, a log page may be a type of page that is used to store log records (e.g., redo log records or undo log records). In some embodiments, log pages may be identical in size to storage pages. Each log page may include a header containing metadata about that log page, e.g., metadata identifying the segment to which it belongs, in some embodiments. Note that a log page may be a unit of organization and may not necessarily be the unit of data included in write operations, in some embodiments. For example, in some embodiments, during normal forward processing, write operations may write to the tail of the log one sector at a time.

In some embodiments, log records (e.g., the individual elements of a log page) may be of several different classes. For example, user log records (ULRs), may be created and understood by users/clients/applications of the storage system, and may be used to indicate changes to user data in a volume, in some embodiments. Control log records (CLRs), may be generated by the storage system and may contain control information used to keep track of metadata such as the current unconditional volume durable LSN (VDL), in some embodiments. Null log records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page, in some embodiments. In some embodiments, log record types may be identified by GUIDs (rather than by integers or enums), which may simplify versioning and development, especially for ULRs.

In some embodiments, a payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size, in some embodiments. In addition, most log records may include additional parameters or data specific to that log record type, and this additional information may be considered the payload of that log record, in some embodiments. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages, in some embodiments.

Note that when storing log records in the log of a segment, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage, in some embodiments; otherwise the storage may be referred to as being out-of-band, in some embodiments. In some embodiments, the payloads of most large ULRs may be stored out-of-band.

In some embodiments, user pages may be the byte ranges (of a fixed size) and alignments thereof for a particular volume that are visible to users/clients of the storage system. User pages may be a logical concept, and the bytes in particular user pages may or not be stored in any storage page as-is, in some embodiments. The size of the user pages for a particular volume may be independent of the storage page size for that volume, in some embodiments. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware, in some embodiments.

In some embodiments, a storage node may be a single virtual machine that on which storage node server code is deployed. Each storage node may contain multiple locally attached storage devices, and may provide a network API for access to one or more segments, in some embodiments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

In various embodiments, storage devices may be a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. A storage device is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments, in some embodiments.

Figure 4:
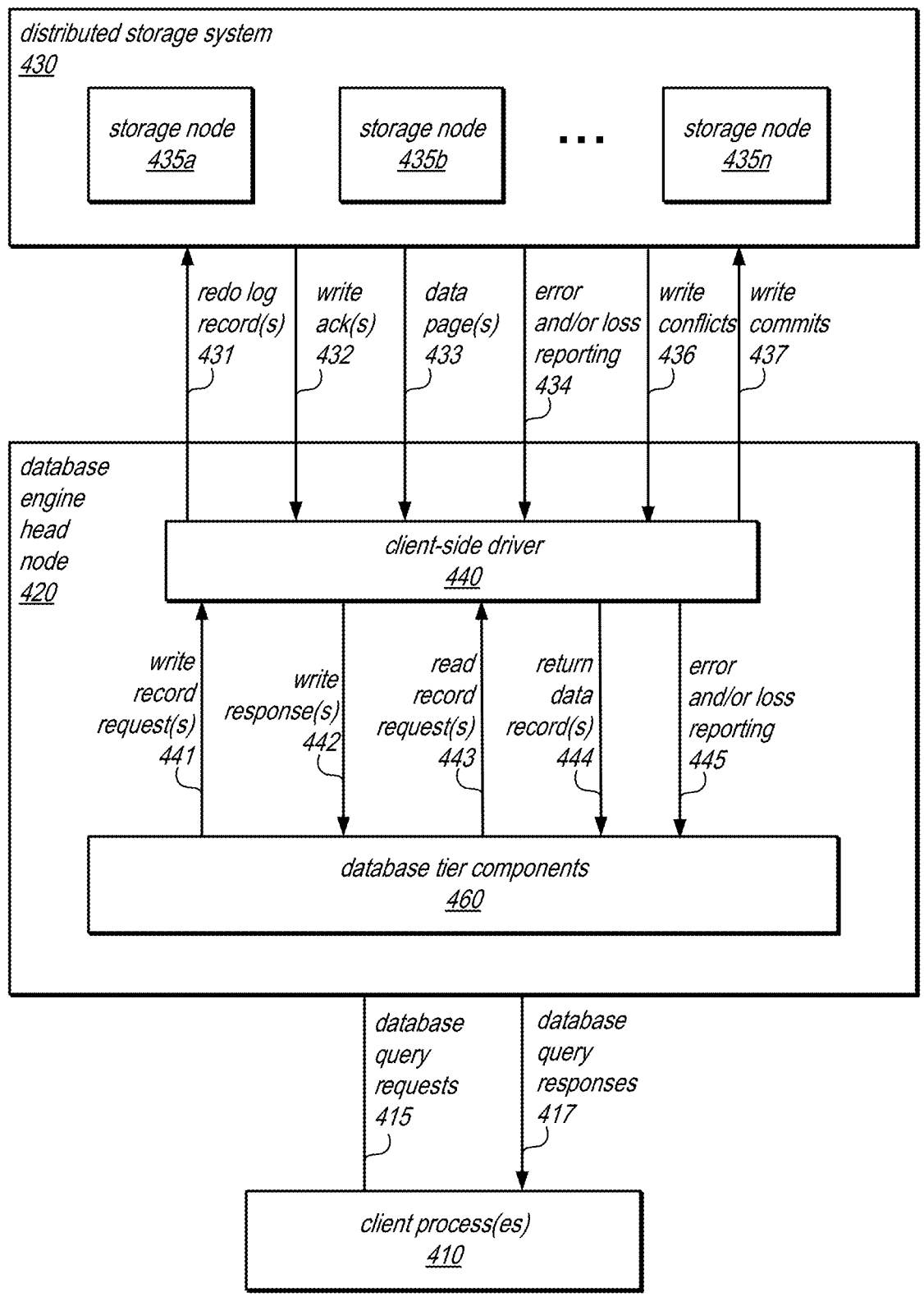
FIG. 4 is a block diagram illustrating various interactions between database engine head nodes within a multi-writer database that implements batch undo processing for transaction rollbacks in a multi-writer database, according to some embodiments.

FIG. 4 is a block diagram illustrating various interactions between database engine head nodes within a multi-writer database that implements batch undo processing for transaction rollbacks in a multi-writer database, according to some embodiments. In some embodiments, the database engine head node 420 may be the database engine of FIG. 1, and the distributed storage system 430 may be the storage system of FIG. 1.

As shown, one or more client processes 410 may store data to one or more databases maintained by a database system that includes a database engine head node 420 and a distributed storage system 430. As shown, database engine head node 420 includes database tier components 460 and client-side driver 440 (which serves as the interface between distributed storage system 430 and database tier components 460). In some embodiments, database tier components 460 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 410 may send database query requests 415 (which may include read and/or write requests targeting data stored on one or more of the storage nodes 435a-435n) to database tier components 460, and may receive database query responses 417 from database tier components 460 (e.g., responses that include write acknowledgements and/or requested data). Each database query request 415 that includes a request to write to a page may be parsed and optimized to generate one or more write record requests 441, which may be sent to client-side driver 440 for subsequent routing to distributed storage system 430. In this example, client-side driver 440 may generate one or more redo log records 431 corresponding to each write record request 441, and may send them to specific ones of the storage nodes 435 of distributed storage system 430. Distributed storage system 430 may return a corresponding write acknowledgement 423 for each redo log record 431 to database engine head node 420 (specifically to client-side driver 440). In some embodiments, storage nodes 435 may return write conflicts 436 (although in other embodiments write conflicts 436 may be included or not as part of write acknowledgements 432). For example, write conflicts may indicate writes that were successfully received and logged, but not committed as they conflict with other writes. Write commits 437 may be sent to indicate which conflicting writes can be committed, in some embodiments. In some embodiments, not illustrated, requests to cancel or otherwise exclude writes may be sent or requests to store one or more different log records that reconcile writes instead of previously stored log records (that individual reflect the reconciled writes) may be sent. Client-side driver 440 may pass these write acknowledgements to database tier components 460 (as write responses 442), which may then send corresponding responses (e.g., write acknowledgements) to one or more client processes 410 as one of database query responses 417.

In this example, each database query request 415 that includes a request to read a data page may be parsed and optimized to generate one or more read record requests 443, which may be sent to client-side driver 440 for subsequent routing to distributed storage system 430. In this example, client-side driver 440 may send these requests to specific ones of the storage nodes 435 of distributed storage system 430, and distributed storage system 430 may return the requested data pages 433 to database engine head node 420 (specifically to client-side driver 440). Client-side driver 440 may send the returned data pages to the database tier components 460 as return data records 444, and database tier components 460 may then send the data pages to one or more client processes 410 as database query responses 417.

In some embodiments, various error and/or data loss messages 434 may be sent from distributed storage system 430 to database engine head node 420 (specifically to client-side driver 440). These messages may be passed from client-side driver 440 to database tier components 460 as error and/or loss reporting messages 445, and then to one or more client processes 410 along with (or instead of) a database query response 417.

In some embodiments, the APIs 431-437 of distributed storage system 430 and the APIs 441-445 of client-side driver 440 may expose the functionality of the distributed storage system 430 to database engine head node 420 as if database engine head node 420 were a client of distributed storage system 430. For example, database engine head node 420 (through client-side driver 440) may write redo log records or request data pages through these APIs to perform (or facilitate the performance of) various operations of the database system implemented by the combination of database engine head node 420 and distributed storage system 430 (e.g., storage, access, change logging, recovery, and/or space management operations). As illustrated in the figure, distributed storage system 430 may store data blocks on storage nodes 435a-435n, each of which may have multiple attached storage devices. In some embodiments, distributed storage system 430 may provide high durability for stored data block through the application of various types of redundancy schemes.

Note that in various embodiments, the API calls and responses between database engine head node 420 and distributed storage system 430 (e.g., APIs 431-434) and/or the API calls and responses between client-side driver 440 and database tier components 460 (e.g., APIs 441-445) may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 420 and/or distributed storage system 430.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality.

In various embodiments, multiple writers implemented at different respective database engine head nodes may be allowed to access a same database while maintaining a single, global read view of the database. Optimistic concurrency may be implemented for writes performed by the different writers using shared storage and asynchronous I/O, in various embodiments. In some embodiments, database engine head nodes (or other write nodes) may be seamlessly added or removed for a database without disruption of database clients.

In some embodiments, database write nodes may use an asynchronous write model to achieve higher write performance with reasonable cost to read performance. Moreover, applying optimistic concurrency techniques may allow the write node, for instance, when writing a log record to continue performing other requests without waiting for the write of the log record to the log to be finalized or to be resolved on a conflict, in some embodiments.

In at least some embodiments, the isolation level supported by multiple writers may include a read-uncommitted isolation level. In some embodiments, the isolation level supported by multiple writers may include a repeatable read isolation level and/or a read-committed isolation level. In such scenarios, isolation may perform the same as if the database only had a single writer when the transactions affecting the rows are on the same instance, in some embodiments. Transactions issued to different instances may have snapshot isolation applied so that the first committed rule is applied and transactions that run into conflicts are aborted, in some embodiments. Different outcomes for such isolation levels may result depending on transaction origin (e.g., a transaction issued on the same write node may succeed where the same transaction issued on another write node would fail), in some embodiments. In some embodiments, a serializable isolation level may not be supported with multiple writers.

Figure 5:
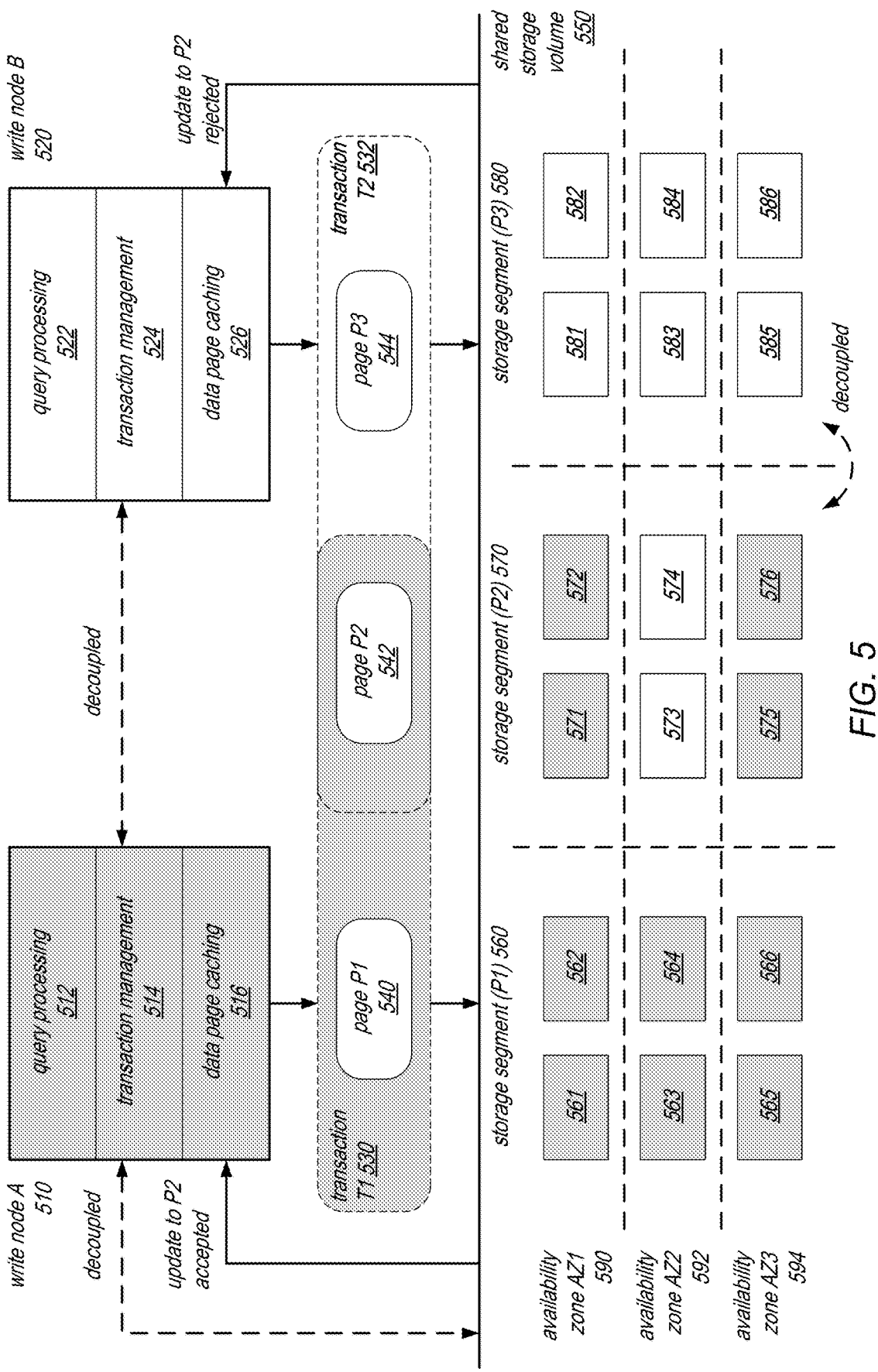
FIG. 5 is a block diagram illustrate a shared storage volume that accepts and rejects page writes based on page conflicts in a multi-writer database that implements batch undo processing for transaction rollbacks in a multi-writer database, according to some embodiments.

FIG. 5 is a block diagram illustrate a shared storage volume that accepts and rejects page writes based on page conflicts in a multi-writer database that implements batch undo processing for transaction rollbacks in a multi-writer database, according to some embodiments. In this example, the write nodes A 510 and B 520 may be different writes to a database like the database engine as discussed in connection with FIG. 1, and the shared storage volume 550 may be implemented by the storage system of FIG. 1.

As shown, each database write node 510 and 520 in this example includes a number of functional layers or components, which are used to implement a database engine. In some embodiments, the query processing components 512 and 522 may be the query parsing, optimization and execution component 305 of FIG. 3, the transaction management components 514 and 524 may be the transaction and consistency management component 330 of FIG. 3, and data page caching component 516 may be implemented using the data page cache 335 of FIG. 3.

In some embodiments, as shown, the database system may be implemented in a decoupled architecture, where different components (e.g. the database nodes and portions of the shared storage volume 550) are implemented as independent components that can function largely independently with minimal cross-component knowledge or coordination. In some embodiments, separate components are implements on separate execution platforms (e.g. hardware servers or virtual machine instances). In some embodiments, each component may manage only a divisible portion of the functionality or data of the database system. The failure of any one independent component will not cause a global failure of the database system, and each independent component may implement their own scheme for auto-scaling and redundancy.

As shown, in this example, the write nodes A and B are decoupled. Thus, the write nodes may execute independently on different execution systems, and the two nodes may not rely on one another for core database engine functionality (e.g. to incoming SQL requests). As discussed, in some embodiments, the two write nodes may both write the shared storage volume 550 in an optimistic fashion, without coordinating with each other to resolve conflicts ahead of time. In some embodiments, the data page cache of the two nodes may reflect different states of the database.

As shown, the database write nodes 510 and 520 are also decoupled from the storage layer (e.g. the shared storage volume 550). In this respect, the storage layer and the database write nodes divide the functionality of database system. In some embodiments, the storage layer will handle all durability aspects of the database system, while the database write nodes will handle other aspects of the database system on top of the storage layer. In some embodiments, the database write nodes 510 and 520 may interact with the shared storage volume 550 via defined service interface. For example, the write nodes may submit page write operations to the storage layer, which will in turn queue and apply the page write operations to the state of the database. This type of separation represents a departure from traditional database systems, where the upper functional layers of the database system tightly coupled to the storage layer, in an integrated functional stack, which is sometimes implemented on the single server.

In some embodiments, the shared storage volume 550 or the storage layer may also implement a conflict resolution functionality, in addition to its durability functions. As discussed, in multi-writer database systems with optimistic database write nodes, the page writes submitted by the write nodes may occasional represent conflicts. For example, two writes from two different nodes may concurrently attempt to modify the same page, which may represent a conflict condition. Thus, in some embodiments, the storage layer may implement a conflict resolution protocol to both detect and resolve conflicting writes.

As shown, in this example, the storage layer is actually implemented by a number of storage nodes (nodes 561-566, 571-576, 581-586), which may be separate instances of virtual machines or virtualized instance of storage devices. As shown in this example, the storage nodes are divided into three storage segments 560, 570, and 580, and also three different availability zones 590, 592, and 594. In some embodiments, each storage segment may be assigned a range of pages for a database. In some embodiments, each availability zone may represent a zone or environment of computing infrastructure that execute independently from other availability zones (e.g., having separate power sources). By distributing storage nodes across multiple availability zones, the database system ensure that it can remain highly available in the face of the failure of one or multiple availability zones. As shown, in some embodiments, the storage segments of the shared volume are decoupled from each other. For example, even the complete failure of all storage nodes in one storage segment will not directly cause a failure of another storage segment.

As shown, in this example, each storage segment in the volume 550 is replicated across six storage nodes. In this type of system, a quorum-based conflict resolution protocol may be implemented. As shown, nodes A and B in this example have issued two transactions T1 530 and T2 532. The two transactions are issued on top of the cached state of the database seen by the two database nodes, and the two transactions are issued concurrently, so that neither transaction is aware of the other transaction. As shown, transaction T1 includes a page update to page A 540 and page B 542, while transaction T2 includes a page update to page C 544 and also page B 542. In this case, the two transactions include a pair of conflict page writes to page B 542.

When these page writes are sent to the storage layer or shared storage volume 550, the different storage nodes of the storage layer may receive the write operations at different times, and may arrive at different conclusions about how to resolve the conflict. As shown, at storage segment 560, which stores page P1, all storage nodes have accepted the update to page P1 (as indicated by the shading of nodes 561-566). At segment 580, which stores page P3, all storage nodes have accepted the update to page P3 (as indicated by the white shading of nodes 581-586). However, at segment 570, which stores page P2, some of the storage nodes (571, 572, 575, and 576) have resolve the write conflict on page P2 in favor of the write issued by write node A (as part of transaction T1), and other storage nodes (573 and 574) have instead resolved the conflict in favor of the write issued by write node B (as part of transaction T2). These nodes are shaded according to how the have resolved the conflict. In this example, the storage layer may implement a quorum-based conflict resolution protocol, where the storage layer will accept the write (and reject the other conflicting write) when a sufficient number (a "quorum") of storage nodes have accepted the winning write. In this example, the quorum needed to accept a write may be four of the six storage nodes for a particular storage segment (i.e. a majority). Because the write issued by write node A has been accepted by four storage nodes in segment 570, this write is deemed to be the winning write. Accordingly, storage nodes 573 and 574 will be overruled and will persist the winning write from node A.

As shown, in some embodiments, when a conflict is resolved, the storage layer will report back to the database write nodes (nodes A and B) whether their submitted writes have been accepted by the storage layer. In this example, the storage layer notifies to node A that its write of page P2 is accepted, and notifies node B that its write of page P2 is rejected. It is then up to write node B to rollback the transaction T2 532, or any other operations, as a result of the rejection of its write to page P2. In some embodiments, the rollback process may involve multiple write operations, as the conflict resolution process at the storage layer may take some time.

In some embodiments, the write nodes (e.g. node A) may not commit a write in its cache state until it receives a confirmation from the storage layer that that write has been accepted at the storage layer. In some embodiments, the storage layer may report a consistency point, to the database nodes, which may represent the highest LSN of writes sent to the storage layer that have been accepted. Thus, if a write node A determines that the current database consistency point has moved beyond its pending writes (e.g. writes to pages P1 and P2), it may commit the result of those writes locally.

Figure 6:
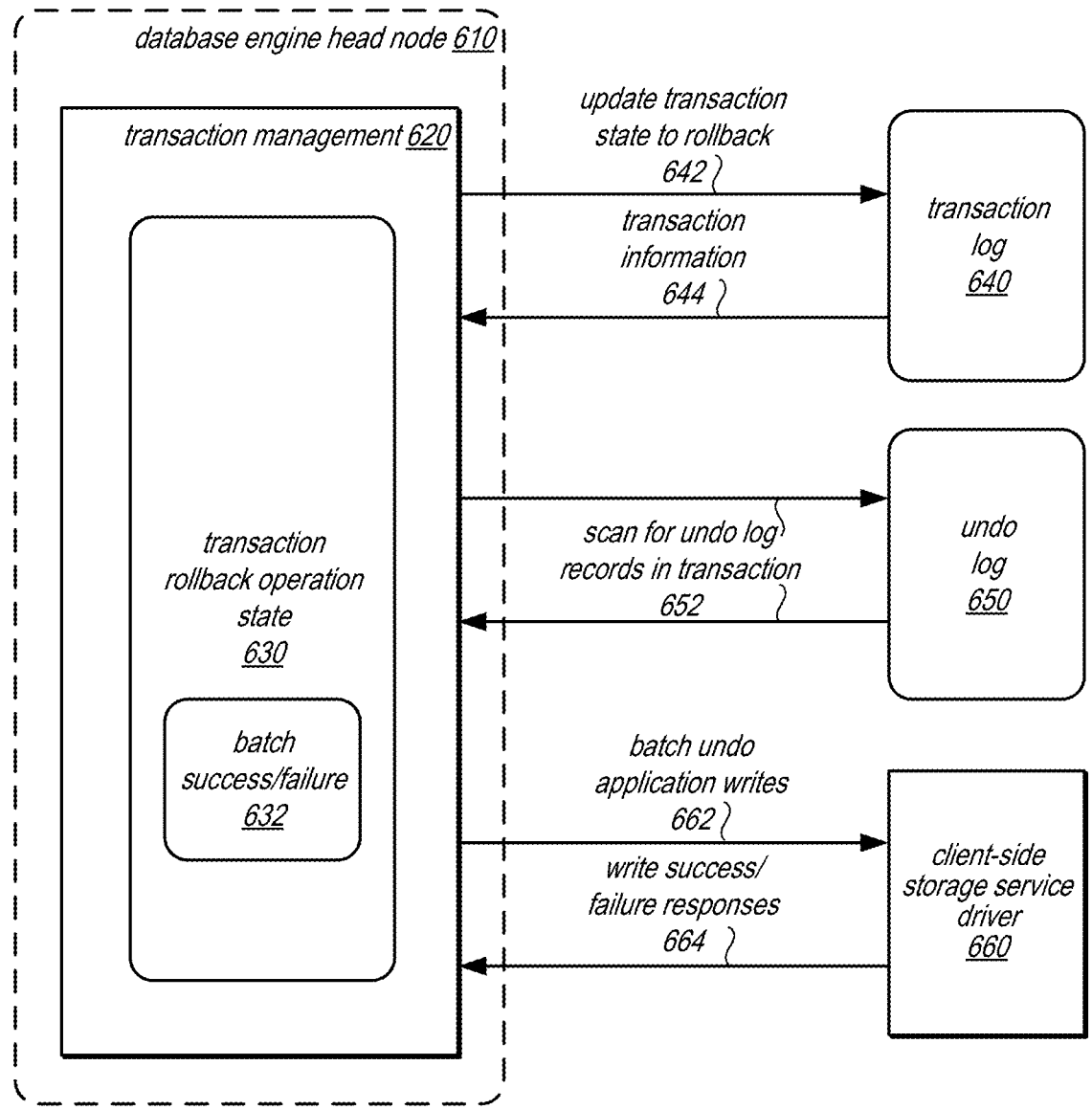
FIG. 6 illustrates an example rollback operation that utilizes batch undo processing, according to some embodiments.

FIG. 6 illustrates an example rollback operation that utilizes batch undo processing, according to some embodiments. Database engine head node 610 (which may be similar to the database engines, database engine head nodes and write nodes discussed above with regard to FIGS. 1-5), in some embodiments. Database engine head node 610 may implement transaction management 620 which may manage the performance of transactions, including rollback operations when a transaction is aborted or fails, in some embodiments.

For an event that triggers a rollback operation, transaction management 620 may access transaction log 640, which may record transactions, to update the state of the transaction to a "rollback" stated, as indicated at 642. Transaction management 620 may also retrieve transaction information, such as first LSN, version identifier, transaction identifiers, or other information used to perform a rollback operation, as indicated at 644. In some embodiments, a rollback operation may be a partial rollback of a subset of modifications made in a transaction. In this way, a conflict may not entirely fail a transaction but rather cause undo processing for a portion. The batch undo processing techniques discussed above and below may be applicable to perform partial rollbacks, in some embodiments.

Transaction management 630 may scan 652 undo log 650, to retrieve undo log records related to the transaction, in some embodiments. For example, a transaction log may be scanned for undo records with a transaction identifier that matches the transaction identifier of the transaction to rollback. In some embodiments, logical sequence numbers (LSNs) may be used to identify which undo log records to obtain (e.g., by comparing LSN values of undo records that are matching or within a range of LSN values). Scanning for undo log records 652 may be performed iteratively or continuously while other roll back operations are performed. For instance, a number of undo records may be identified by scanning 652, and identified as a group for batch processing in transaction rollback operation state 630. The group may be queued, stored, or sent to be applied while scanning continues for more undo records. Thus, the rollback operation may proceed without all undo log records identified, in some embodiments.

Transaction management 630 may send requests to perform batch undo application writes 662 to client-side storage service driver 660 (which may communicate with the distributed storage service similar to client-side storage service driver 325 and 440 in FIGS. 4 and 5. Responses may be received back from client-side storage service driver 660, indicating success or failure, in various embodiments. Batch success/failure 632 may be updated, so that failed batches may be resent. When a rollback operation is complete, transaction management 620 may update transaction log to remove or modify transaction information (e.g., by updating transaction state to "failed" or "aborted").

Figure 7:
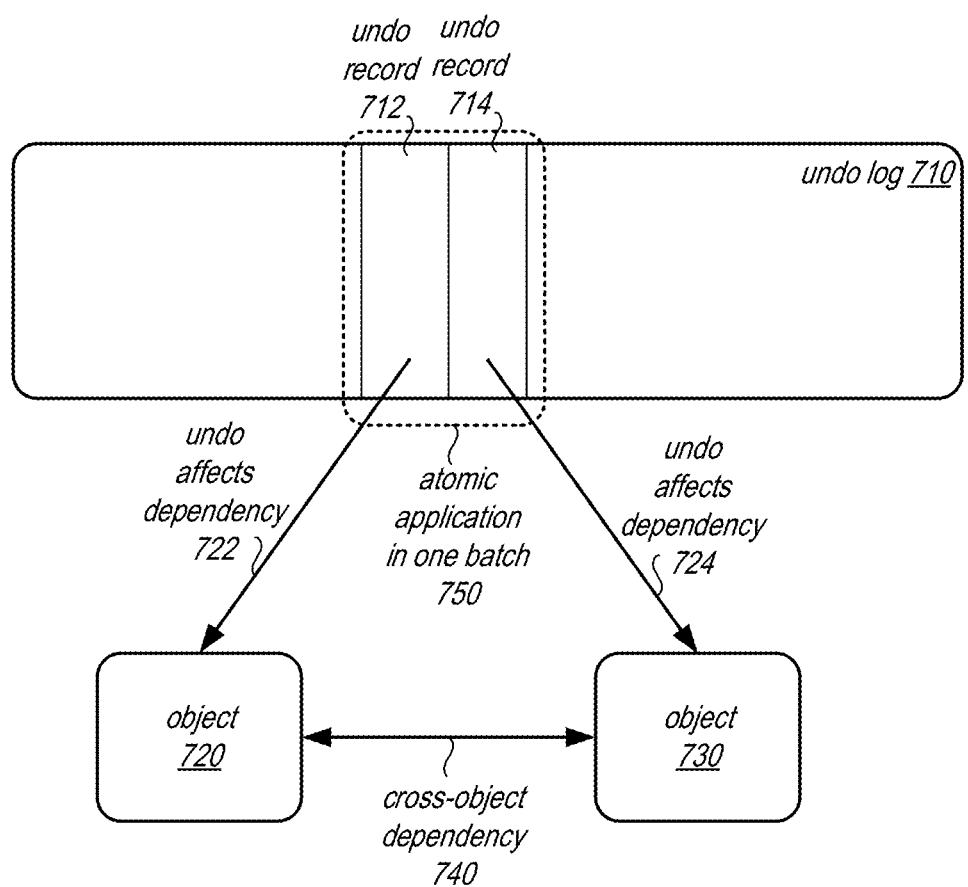
FIG. 7 illustrates dependent undo log records included in a same batch for atomic application, according to some embodiments.

In various embodiments, the handling of write requests to apply undo log records may be performed in idempotent fashion, so that a request to apply again an undo record already performed will not result in a change in the database (e.g., will not overwrite a newer value). In some embodiments, the selection of undo records for a group for batch processing may account for dependent undo log records that should be performed atomically in order to preserve the idempotency of undo log records. FIG. 7 illustrates dependent undo log records included in a same batch for atomic application, according to some embodiments.

Two different data structures or objects in a database, such as objects 720 and 730 may have a cross object dependency 740. Objects 720 and 730 may be tables, rows within tables, pages that stores rows or other groups of database data. For example, object 720 may incorporate as a foreign key, a primary key value from object 730. A prior version described by a change in an undo record may affect one item in the object 720 or 730, and thus may affect the dependency, such as undo record 712 which may affect undo dependency of object 720 as indicated at 722, and undo record 714 which may affect undo dependency of object 730 as indicated at 732.

When evaluating undo log 710, to divide undo log records into batches for execution, groups of undo records for atomic application 750 may be identified so as to be divided into the same batch. Then, when requests to apply the undo records are sent, different techniques for ensuring that the undo operations are applied atomically may be implemented. For example, locking techniques that locks data pages (or other containers) for respective values of the cross-table dependency in each table so that an intervening write cannot cause one undo to succeed and the other fail, in some embodiments. Other techniques which take advantage of the conflict detection techniques discussed above with regard to FIG. 5 may be implemented. For example, a no-op write (that does not change the value in one of the objects, such as a no-op write to object 720) may be sent so that a higher LSN value for that no-op write would prevent an intervening write from succeeding at the page until the other undo records in the group for atomic undo record application have been applied.

Figure 8:
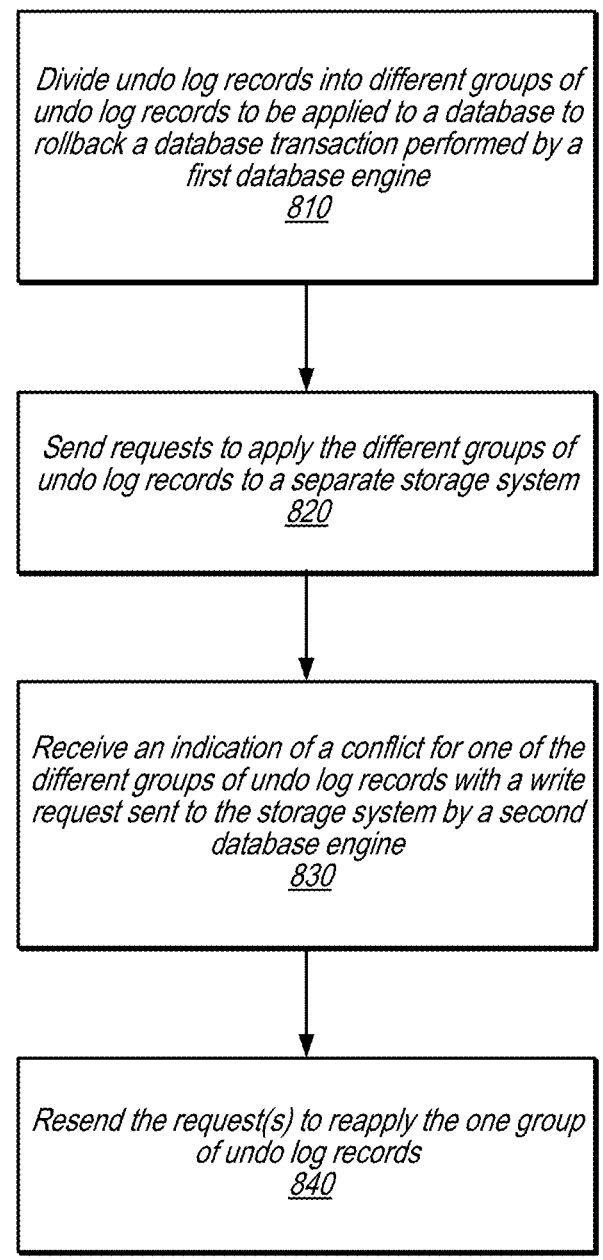
FIG. 8 is a flowchart illustrating a high-level technique for batch undo processing for transaction rollbacks in a multi-writer database, according to some embodiments.

The database service and storage service discussed in FIGS. 2 through 7 provide examples of a system that may perform batch undo processing for transaction rollbacks in a multi-writer database. However, various other types of data stores (e.g., non-log structured) or other database systems that support transactions and multiple writers may implement batch undo processing for transaction rollbacks in a multi-writer database. FIG. 8 is a flowchart illustrating a high-level technique for batch undo processing for transaction rollbacks in a multi-writer database, according to some embodiments. Various different systems and devices may implement the various methods and techniques described below, either singly or working together. For example, a database engine head node and loading cluster may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, undo log records may be divided into different groups of undo log records to be applied to a database to rollback a transaction performed by a first database engine, in some embodiments. For example, the undo log records may be identified, and selected according to an order of the undo log records in the undo log until some threshold batch size is met (e.g., amount of data or number of undo log records). In some embodiments, a constraint may be enforced where atomically applicable undo log records are required to be grouped together in a same group. In some embodiments, the number of undo records in a batch may be selected according to a limit on a number of different writes that may be submitted in a batch write request to the storage system.

As indicated at 820, requests to apply the different groups of undo log records may be sent to a separate storage system, in some embodiments. For example, the requests may be sent as individual write requests for undo log records without waiting on a success or failure response for the previous write request, in one embodiment. In another embodiment, the requests may be sent as a batch request (e.g., via a single API request). For atomically applied undo log records, one or more requests may be sent to atomically apply the two or more undo log records in the batch, in some embodiments (e.g., utilizing a system transaction, min-transaction, or various locking or conflict avoidance techniques as discussed above). In some embodiments, the requests for one group of undo log records may not be sent until it is determined that a prior group of undo log records completed successfully. In other embodiments, the requests for one group of undo log records may be sent without determining that a prior group of undo log records completed successfully.

As indicated at 830, an indication of a conflict for one of the different groups of undo log records with a write request sent to the storage system by a second database engine may be received, in some embodiments. The write request may be another undo record write performed as part of another rollback operation by the second database engine, or may be client-application write to change a value, in some embodiments. The indication may specify the particular failed request or that the batch failed.

As indicated at 840, request(s) to reapply the one group of undo log records may be resent, in some embodiments. For example, the individual write requests may be resent (or a subset of the individual write requests, such as from the conflicted write request and a subsequent conflicted write requests). In another example embodiment, a new batch write request may be resent. For atomically applied undo log records, one or more requests may be resent to atomically apply the two or more undo log records in the batch, in some embodiments.

Figure 9:
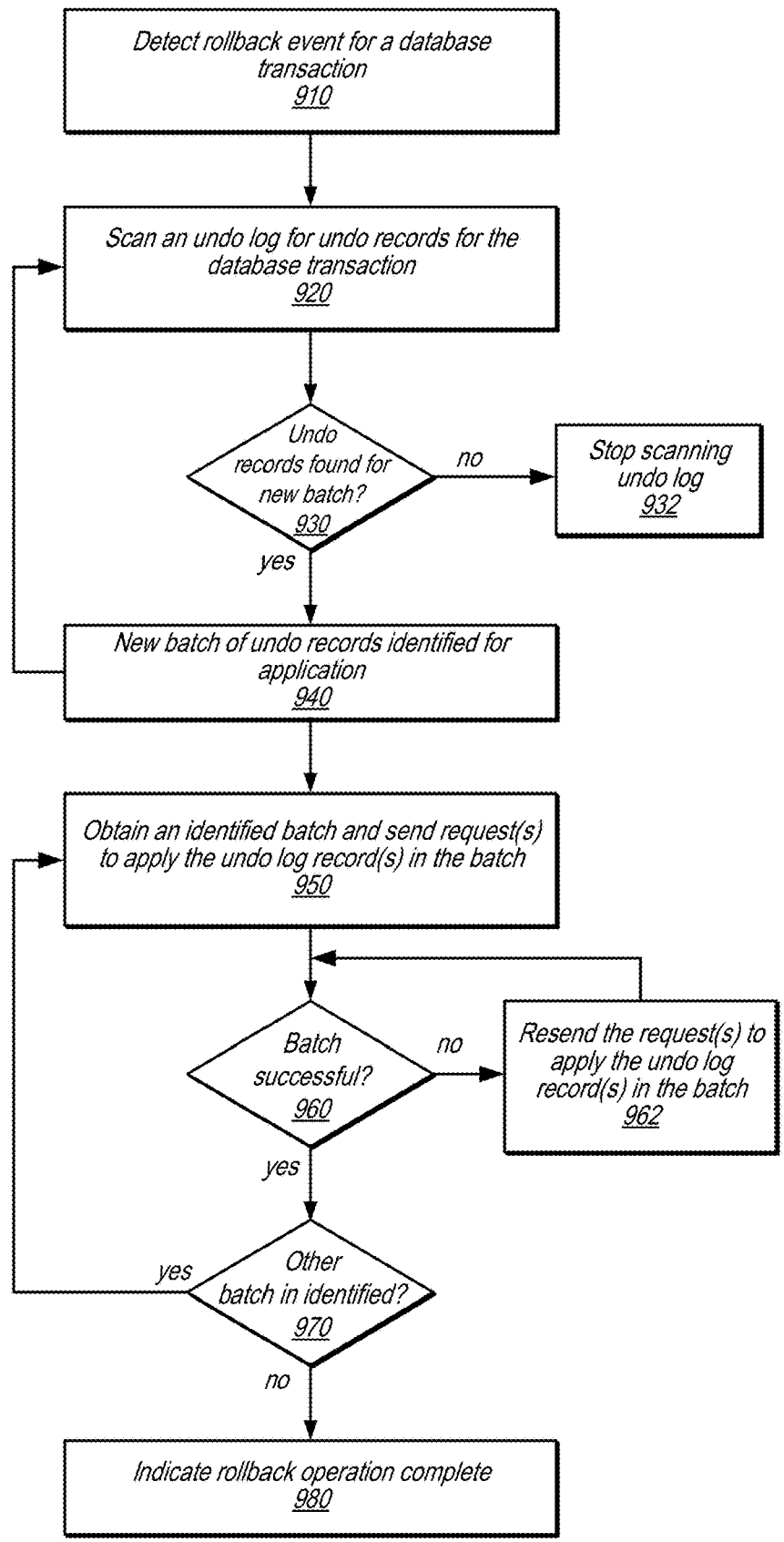
FIG. 9 is a flowchart illustrating a high-level technique for a rollback operation that implements batch undo processing for transaction rollbacks in a multi-writer database, according to some embodiments.

FIG. 9 is a flowchart illustrating a high-level technique for a rollback operation that implements batch undo processing for transaction rollbacks in a multi-writer database, according to some embodiments. As indicated at 910, a rollback event for a database transaction may be detected, in some embodiments. For example, a client application may request the database transaction to be aborted. In another example, a transaction may fail because of a conflicting write by another database engine.

As indicated at 920, a scan of an undo log may be performed for undo records for the database transaction, in some embodiments. For example, a transaction identifier may be compared to transaction identifiers of undo records to determine the matching undo records. In some embodiments, the scan may be performed in an order of the undo log records in the undo log (e.g., an LSN order). As indicated at 930, if enough undo records are found for a new batch, then the new batch of undo records may be identified for application, as indicated at 940, in some embodiments. For example, a queue or other data structure may hold waiting undo log record batches. If no more undo log records for the database transaction are found, then scanning may end (even if other rollback operations continue), as indicated at 932.

As indicated at 950, an identified batch may be obtained (e.g., from a queue) and request(s) to apply the undo log records in the batch sent to a storage system, in some embodiments. For instance, as discussed above, individual requests or a batch write request may be sent. If the batch is not successful according to a received conflict for at least one of the undo log records, then as indicated by the negative exit from 960, the request(s) to apply the undo log record(s) in the batch may be resent, as indicated at 962.

As indicated by the positive exit from 960, a determination may be made as to whether another batch is identified, as indicated at 970. If so, then element 950 may be performed again. If not, then as indicated at 980, an indication may be provided (e.g., to a client application and/or transaction state information that a rollback operation is complete, in some embodiments.

Figure 10:
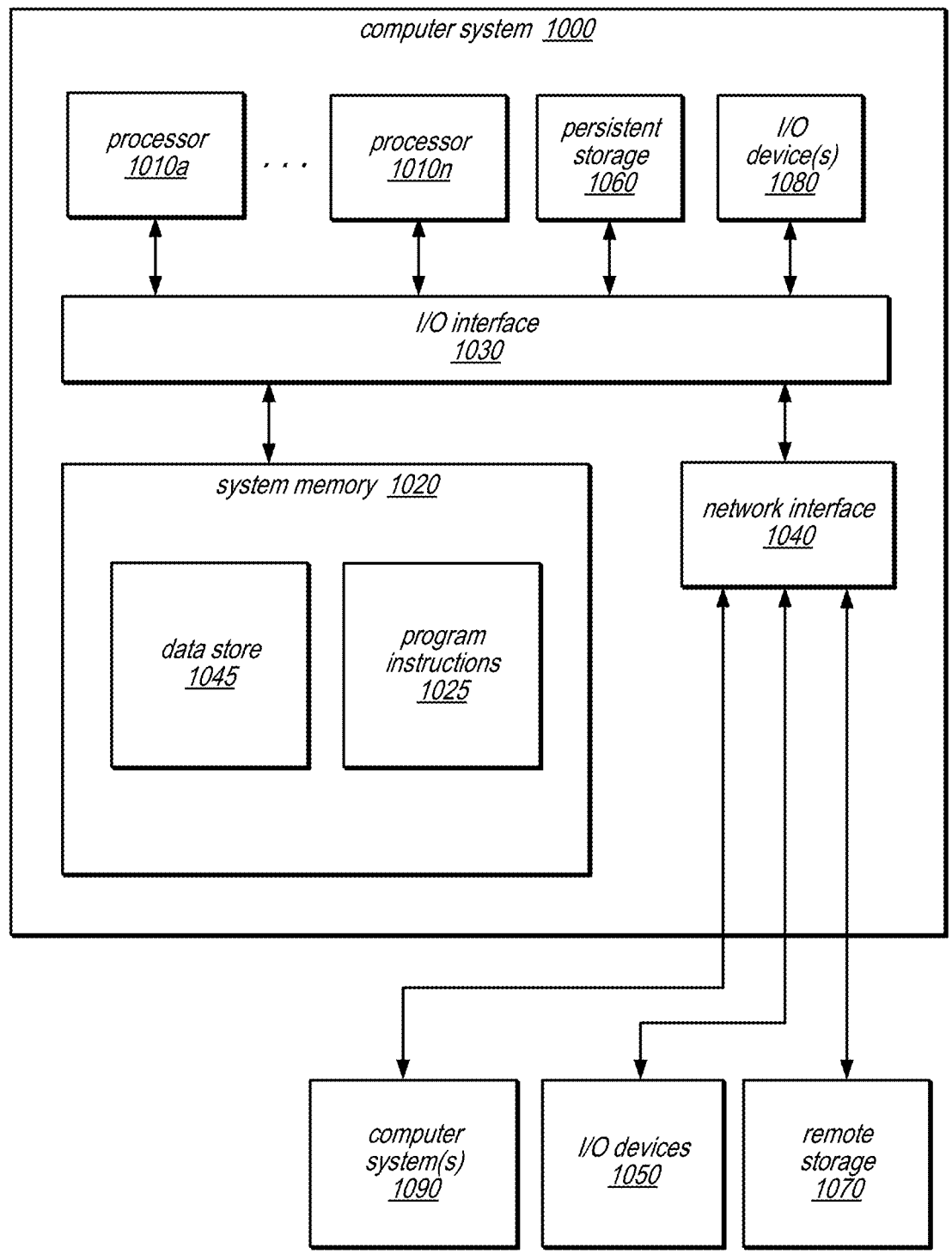
FIG. 10 is a block diagram illustrating an example computer system that can be used to implement one or more portions of batch undo processing for transaction rollbacks in a multi-writer database, according to some embodiments.

FIG. 10 is a block diagram illustrating an example computer system that can be used to implement one or more portions of batch undo processing for transaction rollbacks in a multi-writer database, according to some embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
   at least one processor; and
   a memory, storing program instructions that when executed by the at least one processor cause the at least one processor to implement a database engine, configured to:
      detect a rollback event for a database transaction to a database:
      responsive to the detection of the database rollback event:
         select different groups of a plurality of undo log records to be applied to a database to rollback a database transaction performed by a first database engine;
         send one or more respective requests to apply the different groups of undo log records to a separate storage system for the database;
         receive an indication of a conflict for one of the different groups of undo log records sent to the storage system with a write request to the storage system sent by a second database engine;
         resend the one or more respective requests to reapply the one group of undo log records; and
         determine that the different groups of log records were successfully completed to determine that rollback of the database transaction is complete.

2. The system of claim 1, wherein to select the different groups of the plurality of undo log records, the database engine is configured to apply a batch size threshold to select undo log records for inclusion in the different groups.

3. The system of claim 1, wherein to select the different groups of the plurality of undo log records, the database engine is configured to enforce a requirement that undo log records identified for atomic performance together are included in a same one of the different groups.

4. The system of claim 1, wherein the database engine and the second database engine are implemented as part of a database service of a network-based service platform, wherein the storage system is a storage service implemented as part of the network-based service platform, and wherein conflicts are detected at the storage system according to whether a quorum of storage nodes in the storage service successfully apply a request to write a value without conflict.

5. A method, comprising:
   dividing a plurality of undo log records into different groups of undo log records to be applied to a database to rollback a database transaction performed by a first database engine;
   sending one or more respective requests to apply the different groups of undo log records to a separate storage system for the database;
   receiving an indication of a conflict for one of the different groups of undo log records sent to the storage system with a write request to the storage system sent by a second database engine; and
   resending the one or more respective requests to reapply the one group of undo log records.

6. The method of claim 5, wherein dividing a plurality of undo log records into the different groups of undo log records comprises applying a batch size threshold to select undo log records for inclusion in the different groups.

7. The method of claim 5, wherein dividing a plurality of undo log records into the different groups of undo log records comprises enforcing a requirement that undo log records identified for atomic performance together are included in a same one of the different groups.

8. The method of claim 5, wherein sending the one or more respective requests to apply the different groups of undo log records to the separate storage system for the database comprises sending a request to apply two or more undo log records atomically in one of the groups, wherein a failure of any of the two or more undo log records causes a failure of all of the two or more log records.

9. The method of claim 5, wherein the resent one group of undo log records is performed in idempotent fashion at the storage system.

10. The method of claim 5, wherein the one or more respective requests to apply the different groups of undo log records and the one or more respective requests to reapply the one group are respective batch write requests.

11. The method of claim 5, wherein sending the one or more respective requests to apply the different groups of undo log records to the separate storage system for the database comprises sending a next one of the different groups of undo log records after a prior one of the different groups of undo log records is successfully completed at the storage system.

12. The method of claim 5, wherein sending the one or more respective requests to apply the different groups of undo log records to the separate storage system for the database comprises sending a next one of the different groups of undo log records without determining whether a prior one of the different groups of undo log records is successfully completed at the storage system.

13. The method of claim 5, further comprising:
   determining that the different groups of log records were successfully applied to the storage system to determine that rollback of the database transaction is complete; and
   providing an indication that the rollback of the database transaction is complete.

14. One or more non-transitory, computer-readable storage media, storing program instructions that when executed on or across one or more computing devices cause the one or more computing devices to implement:
   responsive to a rollback event for a database transaction to a database:
      selecting different groups of a plurality of undo log records to be applied to a database to rollback a database transaction performed by a first database engine;
      sending one or more respective requests to apply the different groups of undo log records to a separate storage system for the database;
      receiving an indication of a conflict for one of the different groups of undo log records sent to the storage system with a write request to the storage system sent by a second database engine; and
      resending the one or more respective requests to reapply the one group of undo log records.

15. The one or more non-transitory, computer-readable storage media of claim 14, wherein, in selecting the different groups of the plurality of undo log records, the program instructions cause the one or more computing devices to implement applying a limitation of a number of writes in a batch write request to apply the undo log records selected in a batch.

16. The one or more non-transitory, computer-readable storage media of claim 14, wherein, in selecting the different groups of the plurality of undo log records, the program instructions cause the one or more computing devices to implement enforcing a requirement that undo log records identified for atomic performance together are included in a same one of the different groups.

17. The one or more non-transitory, computer-readable storage media of claim 14, wherein, in sending the one or more respective requests to apply the different groups of undo log records to the separate storage system for the database, the program instructions cause the one or more computing devices to implement sending a request to apply two or more undo log records atomically in one of the groups, wherein a failure of any of the two or more undo log records causes a failure of all of the two or more log records.

18. The one or more non-transitory, computer-readable storage media of claim 14, wherein the one or more respective requests to apply the different groups of undo log records and the one or more respective requests to reapply the one group are respective batch write requests.

19. The one or more non-transitory, computer-readable storage media of claim 14, wherein the one or more non-transitory, computer-readable storage media store further program instructions that when executed on or across the one or more computing devices cause the one or more computing devices to further implement:
  determining that the different groups of log records were successfully applied to the storage system to determine that rollback of the database transaction is complete; and
  providing an indication that the rollback of the database transaction is complete.

20. The one or more non-transitory, computer-readable storage media of claim 14, wherein the database engine and the second database engine are implemented as part of a database service of a network-based service platform and wherein the storage system is a storage service implemented as part of the network-based service platform.

\* \* \* \* \*